United States Patent [19]

Liebman

[11] 3,757,338
[45] Sept. 4, 1973

[54] GLIDE SLOPE LOCK-OUT NETWORK
[75] Inventor: Henry F. Liebman, Lauderhill, Fla.
[73] Assignee: The Bendix Corporation, Southfield, Mich.
[22] Filed: Feb. 5, 1971
[21] Appl. No.: 112,897

[52] U.S. Cl. .............................. 343/108 R
[51] Int. Cl. ............................... G01s 1/18
[58] Field of Search ........... 343/108 R, 109, 107

[56] References Cited
UNITED STATES PATENTS
2,709,053  5/1955  Pine .............................. 343/108 R
2,524,746  10/1950  Anast ............................. 343/108 R Primary Examiner—Benjamin A. Borchelt
Assistant Examiner—Denis H. McCabe
Attorney—Plante, Hartz, Smith & Thompson, Bruce L. Lamb and William G. Christoforo

[57] ABSTRACT

An improved glide slope receiver circuit prevents false acquisition of glide slope and insures that only a good and existing glide slope signal will arm the glide slope circuitry. A normally charged capacitor applies lock-out potential to the glide slope switching network. A reference square wave is applied to open a gate. Below glide slope signals are received out of phase with the reference and proceed through the gate to discharge the capacitor through a time constant network. Discharge of the capacitor releases the lock-out potential at the glide slope switching network, thus permitting the glide slope receiver to acquire the glide slope at a glide slope signal null.

3 Claims, 2 Drawing Figures

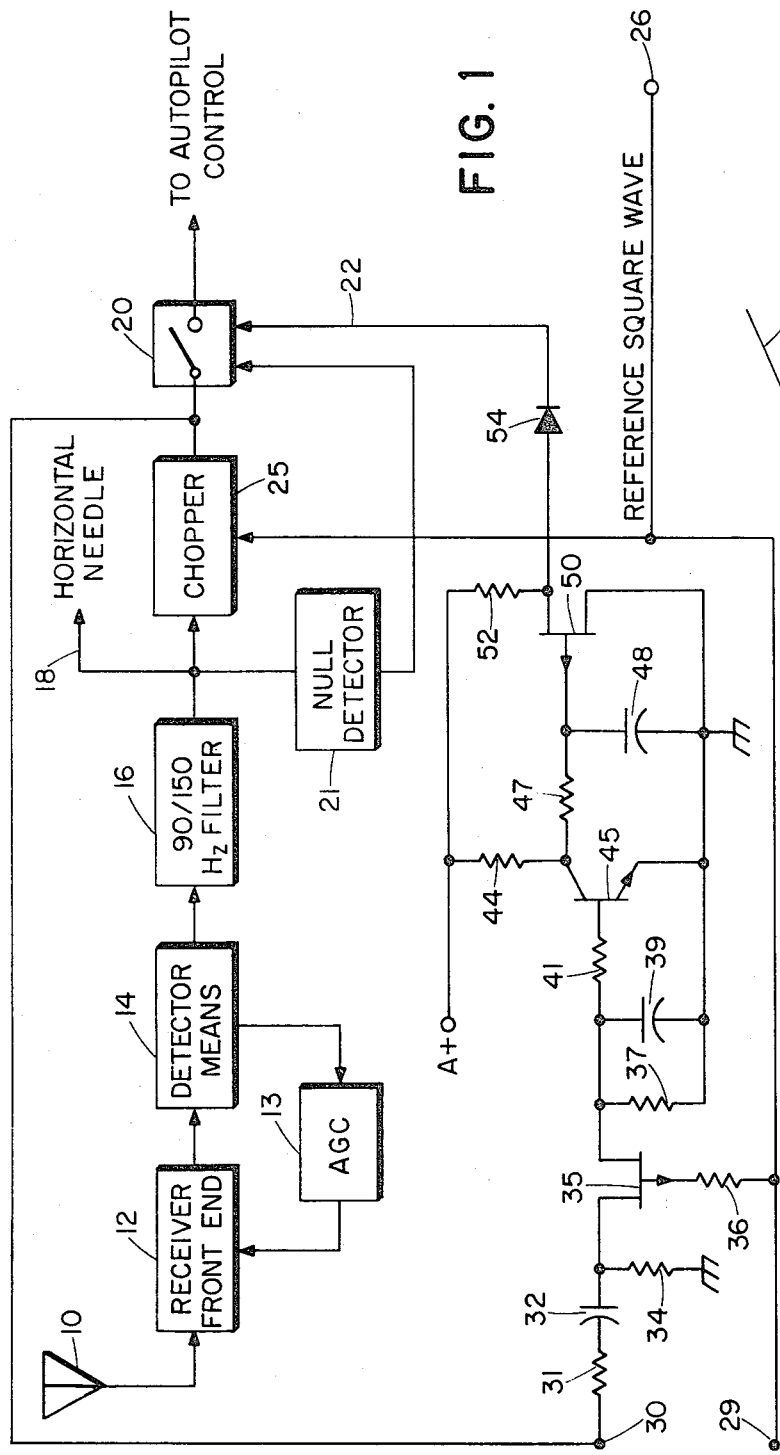
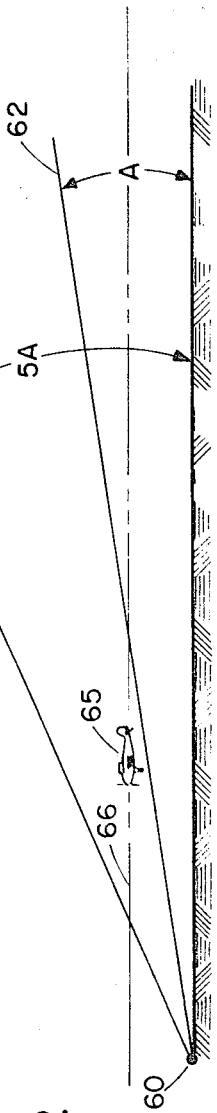
INVENTOR
HENRY F. LIEBMAN

GLIDE SLOPE LOCK-OUT NETWORK

BACKGROUND OF THE INVENTION

This invention relates to glide slope receivers of the type normally used in automatic pilots or flight controllers and more particularly relates to lock-out circuitry for preventing false acquisition of a glide slope.

The glide slope is the vertical guidance portion of the instrument landing system. At present, the glide slope is generated by a ground station located in close proximity to the runway. A beam, spacially modulated at 90 and 150 Hz, is radiated from the ground station to define the glide path. The ground station radiating antennas are arranged so that 90 Hz is detected by a receiver above the glide path at an amplitude proportional to angular displacement therefrom and 150 Hz is similarly detected below the glide path. A null is detected when the glide slope receiver is directly on the glide path. In short, the glide slope is an electronically identifiable radial line radiated from a ground station at a shallow angle with respect to the ground and defines the glide path an approaching aircraft is to follow to execute a successful instrument landing.

The manner by which the glide slope is generated and radiated results in false glide slopes in the form of side lobes. Where A is the angle of the true glide slope with respect to ground, side lobes appear at angles of 2A, 3A, 4A, 5A, etc. For reasons well known to those skilled in the art but to minor importance here, the first significant side lobe, that is a side lobe which comprises a stable false glide slope indistinguishable from the true glide slope except for its steepness, occurs at 5A. The steepness of the first false glide slope and, of course, subsequent false glide slopes made it easy to distinguish the false glide slope from the true. Additionally, in making a standard instrument approach an aircraft flies towards the runway at a constant altitude to intercept the glide slope from below, further reducing the probability of acquiring a false glide slope. Thus, an autopilot working within the above described constraints need only be able to acquire and capture any null or zero point when the autopilot is in the approach mode.

Present autopilot glide slope receivers include a glide slope switching network which locks the autopilot to the glide slope when a null is detected. The autopilot also includes a flight path deviation indicator which is normally a two needle dial instrument, a vertical needle being driven by the localizer receiver and a horizontal needle driven by the glide slope receiver. The direction of deflection of the horizontal needle indicates whether the aircraft is above or below the glide slope. When the null is detected the needle is horizontal. To drive the horizontal needle the glide slope receiver normally includes circuitry to distinguish between the 90 and 150 Hz glide slope signals for determining the direction of horizontal needle deflection and a detector responsive to received glide slope signals for driving automatic gain control circuitry which controls the ratio of horizontal needle deflection with respect to received glide slope signal amplitude and insures that the needle is horizontal in response to a received null. Additionally, means are provided for capturing any null or zero point so that thereafter signals for driving the horizontal needle are also used to control the aircraft as it proceeds down the glide path.

If the autopilot is switched into the approach mode in the absence of a glide slope signal, the autopilot glide slope receiver interprets the absence of a glide slope as a null and will acquire this null even though no glide slope is actually present. On the other hand, if the autopilot is not switched into the approach mode until the aircraft passes through the true glide slope, the aircraft might quite easily acquire false glide slope, thus requiring the pilot to distinguish this false glide slope by the steepness of his subsequent descent.

SUMMARY OF THE INVENTION

This invention provides circuitry for use with a glide slope receiver which normally applies a lock-out potential to the glide slope switching network to prevent the automatic pilot from acquiring a glide slope until the aircraft has received a below glide slope signal for a predetermined period of time thus preventing acquisition of a null when no glide slope exists. This time period is determined by consideration of the aircraft's probable speed and altitude while in the approach mode and is set to be longer than the aircraft can be expected to be between the true glide slope and a false glide slope, thus further preventing acquisition of a false null when the autopilot is switched into the approach mode while between the true glide slope and a false glide slope.

Accordingly, it is an object of this invention to provide lock-out circuitry in a glide slope receiver to prevent acquisition of a false null in the absence of a glide slope when the autopilot is switched to the approach mode.

It is a further object of this invention to provide circuitry in a glide slope receiver which will prevent acquisition of false glide slopes.

It is one more object of this invention to provide circuitry of the type described which will insure with a high degree of confidence that acquisition of a null by a glide slope receiver will be indicative of the acquisition of the true glide slope.

These and other objects of the invention will be made clear in the following description.

BRIEF DESCRIPTION OF THE DRAWINGS

FIG. 1 is a modified schematic diagram of a glide slope receiver including the lock-out circuitry of this invention.

FIG. 2 is an illustration of a true and a false glide path and an aircraft operating in their vicinity.

DESCRIPTION OF THE PREFERRED EMBODIMENT

In FIG. 1 the elements shown in block format generally refer to elements found in the prior art glide slope receivers while the circuit elements refer to components which comprise the circuit embodiment of the invention. Referring now to FIG. 1 glide slope signals are received at antenna 10 and supplied to the receiver front end 12. Glide slope receivers currently used in aircraft are of convention crystal controlled, double conversion, superheterodyne type. Thus receiver front end 12 would typically comprise mixers and local oscillators of the type well known to those skilled in the art and which generates an audio modulated IF at its output. Audio is detected by detector means 14 with the detected audio being used to control the gain of the receiver through the feedback loop including the automatic gain control circuit 13. Detected audio is also applied to 90/150 Hz filter 16, which, in a manner well known to those skilled in the art, generates an output d.c. signal which is of one polarity when the 90 Hz signal predominates and an opposite polarity when the 150 Hz signal predominates, and generates a zero d.c. signal when the exact center of the glide slope is received at antenna 10. As previously mentioned, the d.c. output signal filter 16 is applied to drive the horizontal needle of the flight path deviation indicator, this signal being applied thereto through line 18. The output from filter 16 is also sampled by null detector 21, which in response to a null output from the filter generates a signal which activates the electronic switch 20, shown here for simplicity as a simple switch, but which in its electronic configuration is suitably a gate circuit which latches open upon a signal passing through to connect the output from chopper 25 to the Autopilot Control. In the prior art glide slope receivers electronic switch 20 was actuated only by the output from null detector 21. It will be explained below why and how an inhibiting signal will be applied to the electronic switch via line 22 to prevent closing of the switch until certain other conditions are also met.

Additionally, the d.c. output from filter 16 will be converted into an a.c. signal, of the type required to drive the autopilot controls, by chopper 25 in response to the standard reference square wave supplied by the autopilot via line 26. As was mentioned at the beginning of this section, all the elements described to this point, including an electronic switch which connects the chopper output to the autopilot controls when a null is detected, are currently in use in prior art glide slope receivers and the reference square wave is also available in present day autopilots. In these autopilots, a signal output from chopper 25 is normally out of phase with the reference square wave when a flyup signal is applied to the autopilot controls, indicating that the aircraft is below the glide slope, and the chopper 25 output signal is in phase with the reference square wave when a flydown signal is applied to the autopilot controls indicating the aircraft is above the glide slope.

The above described phase relationship of the chopper output signal with respect to the reference square wave is assumed in this circuitry. The chopper 25 output signal is applied to the terminal 30, which is one input to the slide slope lock-out circuitry, while the reference square wave is applied to terminal 29, the other input terminal to the glide slope lock-out circuitry. The refrence square wave is applied from terminal 29 through resistor 36 to the gate electrode of a P-channel field effect transistor 35 so that negative going pulses of the square wave render transistor 35 conductive while positive going pulses render the transistor nonconductive. The signal at terminal 30 is capacitively coupled through capacitor 32 in the voltage divider comprised of resistors 31 and 34 to the drain electrode of transistor 35. If the reference square wave is in phase with the chopper 25 output signal, transistor 35 will conduct only the negative parts of the chopper 25 output which will negatively charge capacitor 39 which is connected between the source electrode of transistor 35 and ground. An NPN transistor 45 has its emitter electrode connected to ground and its base electrode connected through resistor 41 to the now negatively charged plate of capacitor 39. Transistor 45 is thus rendered nonconductive. It can, of course, be seen that the source electrode of transistor 35 is also connected to the base electrode of NPN transistor 45 through resistor 41 while resistor 37 is shunted across capacitor 39. The collector electrode of transistor 45 is connected to an A+ voltage source (not shown) through resistor 44 while its emitter electrode is connected to ground. However, since transistor 45 is nonconductive no current flows through transistor 45 collector-emitter circuit and capacitor 48, which is connected in series with resistor 47 across the collector-emitter circuit of transistor 45, will charge to the A+ level through resistors 44 and 47. As capacitor 48 charges toward the A+ voltage level, field effect transistor 50, whose gate electrode is connected to the junction of capacitor 48 with resistor 47, is biased off and the voltage at the cathode of diode 54, which is connected between the drain electrode of transistor 50 and electronic switch 20, goes toward the A+ level since the drain electrode of transistor 50 is also connected through resistor 52 to the A+ voltage source, thus forward biasing this diode to apply a positive inhibit signal to electronic switch 20 through line 22. Electronic switch 20 will remain inhibited, that is, so that the switch may not close to permit the chopper 25 output signal to reach autopilot control so long as the positive signal is applied through diode 54 via line 22. However, should the signals at terminals 30 and 29 be out of phase with one another, transistor 35 will be conductive whenever the positive signal appears at its drain electrode thus allowing capacitor 39 to charge to a positive value. When capacitor 39 is charged sufficiently the resulting positive signal at the base of transistor 45 renders that transistor's collector-emitter circuit conductive thus permitting capacitor 48 to discharge therethrough and through resistor 47 to ground. With capcitor 48 discharged, field effect transistor 50 is rendered conductive so that current flows through resistor 52 dropping the voltage at the cathode of diode 54 towards ground, thus extinguishing the positive signal on lead 22 to electronic switch 20. This removes the inhibit signal from electronic switch 20 so that at the subsequent detection of a null by null detector 21, electronic switch 20 will close permitting electrical communication between chopper 25 and the autopilot controls to thereby control the aircraft through the autopilot.

It is of interest to note that in the presence of a glide slope signal which indicates the aricraft is above the glide path, the chopper 25 output will be negative during the transistor 35 low impedance state so that a negative charge will be stored across capacitor 39 further biasing transistor 45 into a nonconductive state, guaranteeing that the inhibit signal on lead 22 will not be extinguished. Additionally, if no glide slope signal is received chopper output is zero and capacitor 39 will not charge.

The circuit components are chosen, particularly resistor 37 and capacitor 39, so that the time required to charge capacitor 39 to a voltage sufficiently high to render transistor 45 conductive will ensure that the aircraft will actually intercept the true glide path. This is explained in FIG. 2, reference to which should now be made. A glide slope is generated by a station at point 60 to define the glide path 62 at a shallow angle A to the ground. As previously mentioned, the first false glide slope 63 resulting from the generation of the true glide slope is at an angle 5A from the ground. For a particular aircraft 65 in level flight along flight path 66 and considering the normal speed and operational altitude of the aircraft, it is a simple geometric exercise to determne the maximum time that the aircraft will be in the flight space between glide paths 62 and 63. The time to charge capacitor 39 from its normally discharged state to a voltage sufficiently high to render transistor 45 conductive is made somewhat longer than the time calculated above. Of course, this time constant can be very simply changed by altering the value of the circuit elements to meet varying aircraft and operational requirements. It should also be noted that before capacitor 39 can charge the reference square wave and chopper signal must be out of phase, which condition occurs when the receiver is below the glide path, thus insuring that the glide slope will not be acquired unless the receiver approaches from below.

Certain modifications and alterations can be made in this invention without departing therefrom. Accordingly, this invention is limited by the true scope and spirit of the appended claims.

The invention claimed is:

1. Means for receiving a glide slope signal which defines a glide slope and including utilization means responsive to said glide slope signal when applied thereto comprising:

means responsive to said glide slope signal for generating a first signal when said receiving means is below said glide slope, for generating a second signal when said receiving means is above said glide slope and for generating a third signal when said receiving means is on said glide slope; and, means responsive to a predetermined time duration of said first signal and the subsequent generation of said third signal without the intervening generation of said second signal for communicating said first, second and third signals to said utilization means.

2. Means for receiving a glide slope signal which defines a glide slope and including utilization means responsive to said glide slope signal when communicated thereto comprising:

means responsive to said glide slope signal for generating a first signal when said receiving means is below said glide slope, for generating a second signal when said receiving means is above said glide slope and for generating a third signal when said receiving means is on said glide slope; and, means responsive to a predetermined time duration of said first signal and subsequently said third signal for communicating subsequent first, second and third signals to said utilization means.

3. Means as recited in claim 2 wherein said communicating means includes:

means responsive to said first signal for generating a gate qualifying signal a fixed time delay after said first signal is generated; and, latching means qualified by said gate qualifying signal and subsequently latched by said third signal for communicating said first, second and third signals to said utilization means.

* * * * *